(12) United States Patent
Satat et al.

(10) Patent No.: US 10,752,158 B2
(45) Date of Patent: Aug. 25, 2020

(54) METHODS AND APPARATUS FOR IMAGING THROUGH FOG

(71) Applicant: Massachusetts Institute of Technology, Cambridge, MA (US)

(72) Inventors: Guy Satat, Cambridge, MA (US); Matthew Tancik, Albuquerque, NM (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 56 days.

(21) Appl. No.: 16/269,566

(22) Filed: Feb. 7, 2019

(65) Prior Publication Data

US 2019/0241114 A1  Aug. 8, 2019

Related U.S. Application Data

(60) Provisional application No. 62/627,498, filed on Feb. 7, 2018.

(51) Int. Cl.
G06K 9/00 (2006.01)
B60Q 1/00 (2006.01)
B60Q 1/08 (2006.01)

(52) U.S. Cl.
CPC ........... *B60Q 1/0023* (2013.01); *B60Q 1/085* (2013.01); *G06K 9/00805* (2013.01); *G06K 9/00825* (2013.01); *B60Q 2300/312* (2013.01)

(58) Field of Classification Search
None
See application file for complete search history.

(56) References Cited

U.S. PATENT DOCUMENTS

| | | | |
|---|---|---|---|
| 4,920,412 A | 4/1990 | Gerdt et al. | |
| 5,202,692 A | 4/1993 | Huguenin et al. | |
| 9,197,789 B2 | 11/2015 | Mukhopadhyay et al. | |
| 9,538,113 B2 | 1/2017 | Grauer et al. | |
| 2010/0040300 A1* | 2/2010 | Kang | G06T 5/40 |
| | | | 382/255 |

(Continued)

OTHER PUBLICATIONS

David, O., et al., Range gated active night vision system for automobiles; published in Applied Optics, vol. 45, Issue 28, pp. 7248-7254, Oct. 2006.

(Continued)

*Primary Examiner* — Vikkram Bali
(74) *Attorney, Agent, or Firm* — Stephen R. Otis

(57) ABSTRACT

A pulsed laser may illuminate a scene that is obscured by dense, dynamic and heterogeneous fog. Light may reflect back to a time-resolved camera. Each pixel of the camera may detect a single photon during each frame. The imaging system may accurately determine reflectance and depth of the fog-obscured target, without any calibration or prior knowledge of the scene depth. The imaging system may perform a probabilistic algorithm that exploits the fact that times of arrival of photons reflected from fog have a Gamma distribution that is different than the Gaussian distribution of times of arrival of photons reflected from the target. The probabilistic algorithm may take into account times of arrival of all types of measured photons, including scattered and un-scattered photons.

20 Claims, 3 Drawing Sheets

(56) References Cited

U.S. PATENT DOCUMENTS

| | | | | |
|---|---|---|---|---|
| 2014/0140619 A1* | 5/2014 | Mukhopadhyay | ...... | G06T 5/002 |
| | | | | 382/167 |
| 2014/0177960 A1* | 6/2014 | Park | ........................ | G06T 5/003 |
| | | | | 382/167 |
| 2014/0205192 A1* | 7/2014 | Wang | ........................ | G06T 5/00 |
| | | | | 382/167 |
| 2017/0262732 A1* | 9/2017 | Deng | ...................... | G01S 17/06 |

OTHER PUBLICATIONS

Holodovsky, V., et al., In-situ multi-view multi-scattering stochastic tomography; published in 2016 IEEE International Conference on Computational Photography (ICCP), May 2016.

Kadambi, A., et al., Occluded Imaging with Time-of-Flight Sensors, published in ACM Transactions on Graphics (TOG), vol. 35, Issue 2, Article No. 15, ACM New York, NY, USA, May 2016.

Levis, A., et al., Airborne Three-Dimensional Cloud Tomography; published in 2015 IEEE International Conference on Computer Vision (ICCV), Dec. 2015.

Satat, G., et al., All Photons Imaging Through Volumetric Scattering; published in Scientific Reports, vol. 6, Article No. 33946 (2016).

Schilling, B., et al., Multiple-return laser radar for three-dimensional imaging through obscurations; published in Applied Optics, vol. 41, Issue 15, pp. 2791-2799, May 2002.

\* cited by examiner

METHODS AND APPARATUS FOR IMAGING THROUGH FOG

RELATED APPLICATIONS

This application claims the benefit of U.S. Provisional Application No. 62/627,498 filed Feb. 7, 2018 (the "Provisional").

FIELD OF TECHNOLOGY

The present invention relates generally to imaging through scattering media.

BACKGROUND

Radar and time-gating are two conventional technologies that are employed for imaging through fog.

Radar may employ radio waves with long wavelengths at which fog is transparent. However, the long wavelengths may cause the radar to have spatial resolution that is so poor that it is hard or even impossible to classify objects, and the use cases may be limited to detection. Furthermore, at these long wavelengths, the optical contrast of the radar may be so poor that it is only possible to measure bulk properties of materials, and impossible for example to identify road lane marks and read road signs.

Time gating may image a far-away object through fog. To do so, time-gated measurements may be taken of visible light reflecting from a foggy scene. However, conventional time gating requires long integration times and prior knowledge of the scene depth map. Furthermore, conventional time gating rejects scattered photons during the measurement process. Because conventional time gating rejects a substantial amount of the optical signal, it operates at a low signal-to-noise ratio (SNR).

SUMMARY

In illustrative implementations of this invention, an system images through fog, in such a way as to solve or mitigate each of these problems.

In illustrative implementations, the system recovers reflectance and depth of a scene occluded by dense, dynamic, and heterogeneous fog.

In some cases, a pulsed laser emits pulses of light that illuminate a foggy scene. Light reflects back to a single-photon avalanche detector (SPAD) camera from or through the fog. In some cases, each pixel of the SPAD camera detects only one photon during each frame. Some photons that arrive at the SPAD camera reflect from a target object which is being imaged. Other photons that arrive at the SPAD camera reflect from the fog itself without ever interacting with the target object.

In some cases, a computer performs a probabilistic algorithm to estimate pixel-wise fog parameters from the SPAD measurements without any calibration or prior knowledge of the scene depth map. The probabilistic algorithm may exploit the fact that times of arrival of photons reflected from the fog itself have a distribution (Gamma) that is different than the distribution (Gaussian) of times of arrival of photons reflected from the target object.

The probabilistic algorithm accurately estimates reflectance and depth of the target, even through dense fog, without prior knowledge of the fog or the depth map of the scene.

The probabilistic algorithm may take into account times of arrival of all classes of measured photons (including scattered and un-scattered photons), in order to estimate fog properties and to computationally reject the fog from the measurement. Using all of the optical signal (including scattered, un-scattered, background and signal photons) improves resolution and SNR (signal-to-noise ratio) because all of the photons provide information about the target, the fog, or both. For instance, some scattered photons: (a) reflect from the target but scatter before reaching the detector; and (b) provide information about both the target and the fog. Other scattered photons: (a) reflect from the fog without ever interacting with the target; and (b) provide information about the fog. Yet other photons: (a) reflect from the target and are never scattered by the fog; and (b) provide information about the target.

Using all types of measured photons (in the present invention) is quite different than conventional time gating. In conventional time gating, photons that arrive during a narrow time-gate are taken into account and all other photons are disregarded. In conventional time-gating: (a) background photons that arrive during the time gate may cause the measurements to be inaccurate; and (b) photons that arrive outside the time gate are completely disregarded and thus information about the fog is lost. In contrast, in the present invention: (a) both early arriving ballistic photons and later-arriving scattered photons are counted; and (b) data from the scattered photons provides information about the fog that is employed to computationally separate the reflections from the fog and the reflections from the target. (Ballistic photons are photons that reflect from the target and travel to the detector without scattering.)

In illustrative implementations, the SPAD sensing is pixel-by-pixel and the probabilistic algorithm is performed pixel-by-pixel. This pixelwise sensing and pixelwise computation enables the system to handle heterogenous fog, i.e., a fog whose optical density varies as a function of spatial position. Thus, in illustrative implementations, the system accurately measures reflectance and depth of a target that is obscured by a heterogeneous fog.

In some implementations, the SPAD sensing has a time resolution that is sufficiently fast to image a dynamically changing foggy scene. For instance, the SPAD sensing may have a fast time resolution that enables the system to accurately measure reflectance and depth of a target, even though the target, the fog or both are dynamically changing over time.

In some cases, the system operates in reflection mode. That is, the SPAD camera may measure photons of light that reflect from a scene that is wholly or partially obscured by the fog or that reflect from the fog itself.

In some cases: (a) a target object is partially or wholly obscured by fog (to the unaided human eye); and (b) despite the fog, an imaging system accurately measures both reflectance and depth of the target object. To do so, a SPAD camera may capture time-resolved single photon counts of light reflecting from the foggy scene. A probabilistic algorithm may be employed to estimate the properties of the back reflection from the fog. The back reflection may be subtracted from the total measured photons to recover the signal from the target and may be processed to determine, on a pixel-by-pixel basis: (a) reflectance of a target, and (b) a depth map of the target.

In some cases, the system has a large field of view. In some use scenarios, the system images through dense fog or other highly turbid scattering media. For instance, in some use scenarios, the system accurately measures reflectance and depth of a target even though tens or hundreds of scattering events occur before a scattered photon reaches the detector.

This invention has many practical applications. For instance, this invention may accurately recover, through dense fog, an image and depth map of an object. Among other things, this ability to image through dense fog: (a) may enable self-driving cars to operate in foggy weather; (b) may be employed to augment a human driver's vision in foggy weather, by providing a heads-up-display or audio cues that alert the driver to occluded objects and that read road signs; (c) may be employed by aircraft (e.g., drones, airplanes, and helicopters) to detect obstacles during low-level flight through fog; (d) may facilitate airborne imaging of objects obscured by fog (e.g., drone imaging of objects on the ground that are hidden by fog); (e) may enable trains to maintain speed in foggy weather; and (f) may be employed by watercraft (e.g., naval vessels) to detect obstacles while navigating in foggy weather.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

Figure 1:
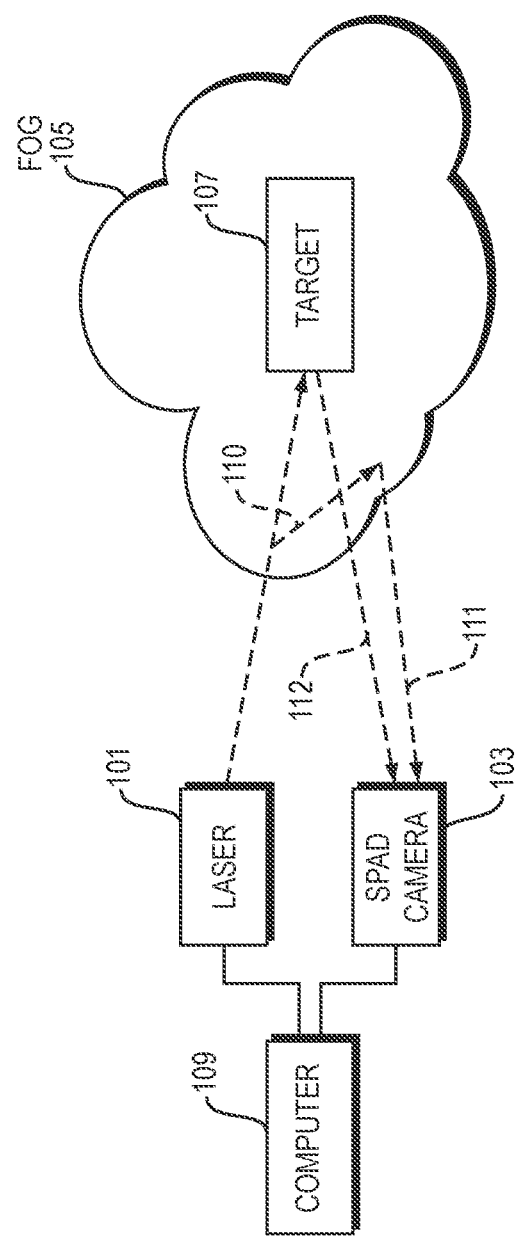
FIG. 1 shows hardware of an imaging system.

FIG. 1 shows hardware of an imaging system, in an illustrative implementation of this invention. In FIG. 1, a laser 101 emits pulsed light to illuminate a foggy scene. The foggy scene includes a target object 107 and fog 105. Photons reflect from the foggy scene and travel to a SPAD camera 103. In FIG. 1, each pixel of SPAD camera 103 detects only one photon during each frame.

A portion of the measured photons are what we call "signal photons"—that is, photons that have interacted with target 107. For instance, some of the signal photons reflect from target 107 and travel to SPAD camera 103 via path 112. Other signal photons reflect from target 107 and scatter before reaching SPAD camera 103.

Another portion of the measured photons are what we call "background photons"—that is, photons that have reflected from the fog itself and that have not interacted with target 107. For instance, some of the background photons may reflect from the fog via paths 110 and 111, without interacting with target 107. A computer 109 may perform a probabilistic algorithm that: (a) takes the SPAD measurements as input; (b) computationally separates the background reflection (from the fog itself) and the reflection from the target; and (c) calculates reflectance and a depth map of the target. The probabilistic algorithm may leverage the fact that times of arrival of photons reflected from fog itself have a distribution (Gamma) that is different than the distribution (Gaussian) of times of arrival of photons reflected from objects occluded by fog.

Parametric Model

The following 14 paragraphs describe a mathematical model of photons that have reflected from a foggy scene.

This model may be employed to model reflected light from a foggy scene, in the following physical setup: A pulsed light source may emit photons into a foggy scene. A time-resolved camera may be located adjacent to the light source. Each pixel in the camera may detect time of arrival of individual photons as they arrive at the sensor, after reflecting from the fog itself or from a target in the foggy scene. Each pixel of the camera may detect a single photon during each frame.

In this model, a measured photon may be classified as either (a) a background photon, (b) a signal photon, or (c) a dark count photon.

A background photon is a photon that did not interact with the target (i.e. did not interact with the object being imaged). Thus, a background photon may provide information about only the fog. Due to scattering dynamics, background photons may arrive at different times.

A signal photon is a photon that interacted with the target. Thus, a signal photon may provide information about target reflectivity and depth.

Dark count photons may be measured due to dark current that flows in the detector even when no actual photons are entering the detector. The dark count photons may be uniformly distributed in time. In illustrative implementations, the dark count rate in the detector is at least an order of magnitude less than the background and signal counts in the measurements, and thus may be disregarded in the model.

Background Photons: First we model background photons (i.e., photons that did not interact with the target). In this model, the distance a photon propagates between consecutive scattering events is exponentially distributed with a mean of $1/\lambda$. That is, $1/\lambda$ is the mean distance a photon propagates between scattering events. Equivalently the time between scattering events is also exponentially distributed $\tau_i \sim \text{EXP}(\mu_s)$, where $1/\mu_s$ the mean time between scattering events. Since the scattering events are independent, so are the different times $\tau_i$.

In this model, a detected photon undergoes multiple scattering events such that the detection time is $T=\Sigma_{i=1}^{k}\tau_i$. The sum of independent exponential random variables is Gamma distributed $T\sim\text{GAMMA}(k, \mu_s)$, where k and $\mu_s$ are the shape parameter and rate parameter, respectively. Thus, in this model, the time of arrival (at the detector) of background photons is a Gamma distributed random variable.

In this model, the probability density function of the time of arrival of a background photon at a given pixel of the detector is:

$$f_T(t\mid B) = \frac{\mu_s^k}{\Gamma(k)} t^{(k-1)} \exp\{-\mu_s t\} \qquad \text{(Eq. 1)}$$

where t is time, Γ(k) is the Gamma function, and the shape and rate parameters k and $\mu_s$ encode the physical properties of the fog.

Signal Photons: Next, we model signal photons (i.e., photons that interacted with the target). In this model, the time of arrival (at the detector) of signal photons is a Gamma distributed random variable. Using a Gaussian distribution may be justified in this context, because: (a) the number of scattering events is large; and (b) when the shape parameter, k, of a Gamma distribution is large it resembles a Gaussian distribution. The distribution mean, $\mu$, corresponds to the depth of the object, and the variance, $\sigma^2$, encodes the scattering these photons undergo.

In this model, the probability density function of time of arrival of a signal photon at a given pixel of the detector is:

$$f_T(t|S) = \frac{1}{\sqrt{2\pi\sigma^2}} \exp\left\{-\left(\frac{t-\mu}{\sigma}\right)^2\right\}$$ (Eq. 2)

where t is time and $\pi$ is Archimedes' constant.

In this model, the overall probability density function of detecting a photon at a given pixel of the detector is:

$$f_T(t) = f_T(t|S)P(S) + f_T(t|B)P(B)$$ (Eq. 3)

where t is time, P(S) is the probability that a photon is a signal photon, and P(B) is the probability that a photon is a background photon.

In many use scenarios, there are much more background photons than signal photons.

In Equations 1, 2 and 3, the subscript T signifies that the probability density function is a function of time-domain measurements.

In this model, define P(B)=b, and define P(S)=r. Here b and r include the optical losses of the system (such as absorption and detector efficiency). The ratio between b and r captures the probability of measuring a background versus signal photon. For instance, b is affected by fog reflectivity and r is affected by target reflectivity.

The parametric model (and the physical phenomena) described in the preceding 14 paragraphs are non-limiting examples. This invention may be implemented in many other ways (e.g., by employing a different model).

Imaging Through Dense Fog

In illustrative implementations, a SPAR camera captures pixel-wise time-resolved photon counts of light reflecting from a foggy scene. One or more computers may take these pixel-wise time-resolved photon counts as inputs, and may computationally separate (a) background light (reflection from the fog itself) and (b) signal light (reflection from the target).

In some cases, a computer estimates target depth and reflectance. To do so, the computer may perform an algorithm that includes: (a) time profile estimation; (b) background distribution estimation, (c) signal estimation; and (c) target recovery.

Time Profile Estimation

In some cases, a total time profile is estimated. This total time profile is a pixelwise probability density function $f_T(t)$ of the time of arrival (at the detector) of all measured photons, including all measured background photons and all measured signal photons. (Recall that, in illustrative implementations, each pixel of the SPAD camera detects only one photon during each frame.) In $f_T(t)$, t is time.

A kernel density estimator (KDE) may be employed to map the individual photon detection events to $f_T(t)$. The estimated probability density function that is estimated by KDE may be denoted $\widehat{f_T}(t)$. KDE has several advantages as opposed to a traditional histogram. Among other things: (a) there is no need to specify a bin size for KDE; and (b) KDE performs well in cases of a few sampling points (such as may occur here).

Background Estimation

In illustrative implementations, the background light (reflected from the fog itself) is much stronger than the signal light (reflected from the target). Thus, the raw photon counts may be used to estimate the parameters in $f_T(t|B)$. As noted above, the time of arrival (at the detector) of background photons may be modeled as a Gamma distributed random variable. The distribution parameters of the Gamma distribution may be estimated by MLE (maximum likelihood estimation). The estimated Gamma distribution is denoted by $\widehat{f_T}(t|B)$. Since the majority of the photons are background photons, all measured photons may be taken into account in this step. Thus, in this step, the signal photons may effectively be treated as noise.

Signal Estimation

In many use scenarios, such as a dense fog, P(B)>>P(S), that is, a measured photon is much more likely to be a background photon than a signal photon. To estimate the signal from the target, we may, at this step, assume that P(B)≈1. If we divide Equation 3 by P(B)≈1 and rearrange terms, we find that $$f_T(t|S) \approx f_T(t) - f_T(t|B).$$

In some cases, $f_T(t|S)$ is estimated by subtracting $f_T(t|B)$ from $f_T(t)$ and then fitting the difference to a Gaussian distribution. Put differently, $f_T(t) - f_T(t|B)$ may be fitted to a Gaussian that estimates the signal $\widehat{f_T}(t|S)$.

Scene Reconstruction

With the background and signal estimated distributions, the parameters r and b may be estimated by solving:

$$[\hat{r}, \hat{b}] = \arg\min_{[r,b]} \sum_t (r\widehat{f_T}(t|S) + b\widehat{f_T}(t|B) - \widehat{f_T}(t))^2$$ (Eq. 4)

If there is no fog, then P(B)=b→0, that is, the probability of a measured photon being a background photon approaches zero. Likewise, if there is no target, then P(S)=r→0, that is, the probability of a measured photon being a signal photon approaches zero.

The estimators discussed above (e.g., $f_T(t|S)$ and $f_T(t|B)$) are probability density functions. These estimators may be mapped to actual photon counts. Specifically, the estimators $f_T(t|S)$ and $f_T(t|B)$ may be mapped to N(t), the number of photons measured during time bin t, by computing a normalization factor $\hat{\alpha}$ such that $$\sum_t N(t) = \hat{\alpha} \sum_t \left[\hat{r}\widehat{f_T}(t|S) + \hat{b}\widehat{f_T}(t|B)\right].$$

This normalization step may be desirable, to achieve consistent results across pixels that receive a different number of photons. With this normalization factor, the estimated model is:

$$\hat{N}(t) = \hat{\alpha}[\hat{r}\widehat{f_T}(t|S) + \hat{b}\widehat{f_T}(t|B)]$$ (Eq. 5)

Next, the target parameters (reflectance and depth) may be extracted.

Reflectance Estimation: The reflectance value per pixel may be calculated as the peak of $\hat{\alpha}\hat{r}\widehat{f_T}(t|S)$. Alternatively, the reflectance value per pixel may be calculated as $\hat{\alpha}\hat{r}$ (although this alternative may be noisier in practice). The estimated depth may be used to account for depth dependent signal attenuation.

Depth Estimation: In some cases, the target depth is encoded in the early part of the Gaussian distribution. The early part of the Gaussian distribution corresponds to ballistic photons (i.e., signal photons that traveled directly to the detector without any scattering and thus arrived earlier than photons that scattered while traveling to the detector). In some cases, the estimated Gaussian variances are in the order of 1-2 time bins, due to both scattering and measurement jitter.

In some cases, the target depth for a pixel is estimated as being equal to $\hat{\mu}$ (i.e., the mean of the estimated Gaussian distribution for the pixel).

In some cases, the Gaussian distribution for a pixel is fitted regardless of whether there is a reflection of the target at the pixel. However, the reflectance estimation may be employed as a confidence map to reject pixels where no target exists.

As noted above, the SPAD sensing may be pixel-by-pixel and the probabilistic algorithm may be performed pixel-by-pixel. For instance, each of the following terms may be estimated pixel-by-pixel: $f_T(t|S)$; $f_T(t|B)$; $f_T(t)$; r; b; α, N(t). Likewise, the Gaussian parameters k and $\mu_s$ (i.e., the shape and rate parameters, respectively) may be calculated pixel-wise.

Figure 2:
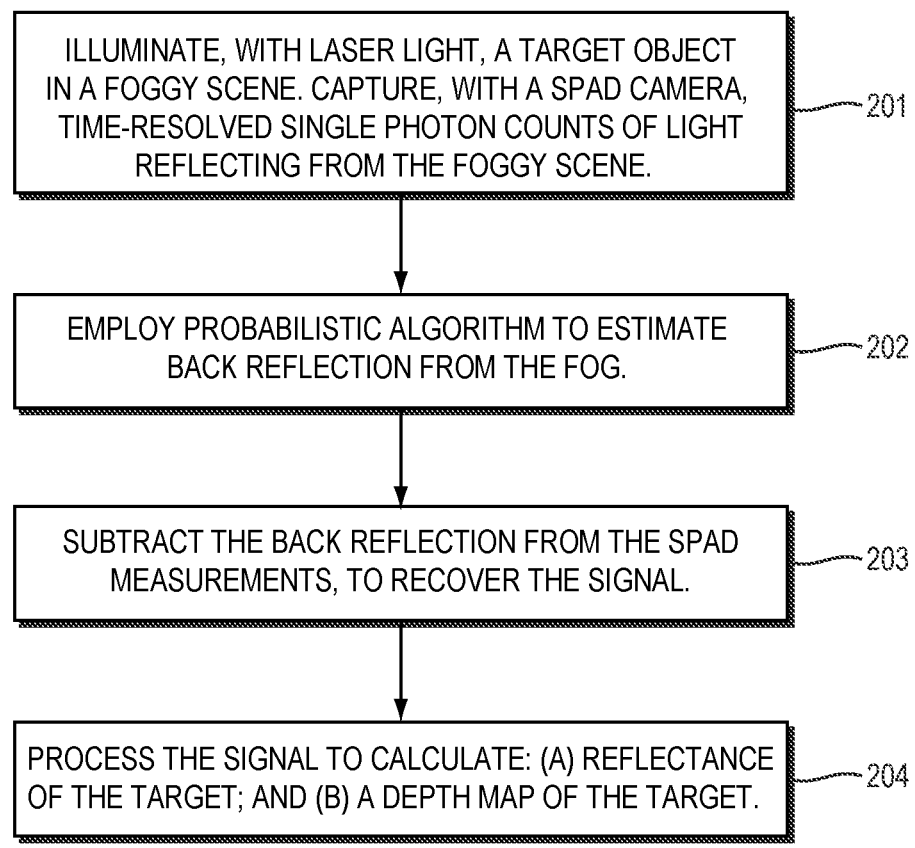
FIGS. 2 and 3 are each a flowchart of a method of imaging reflected light from a foggy scene.
Figure 3:
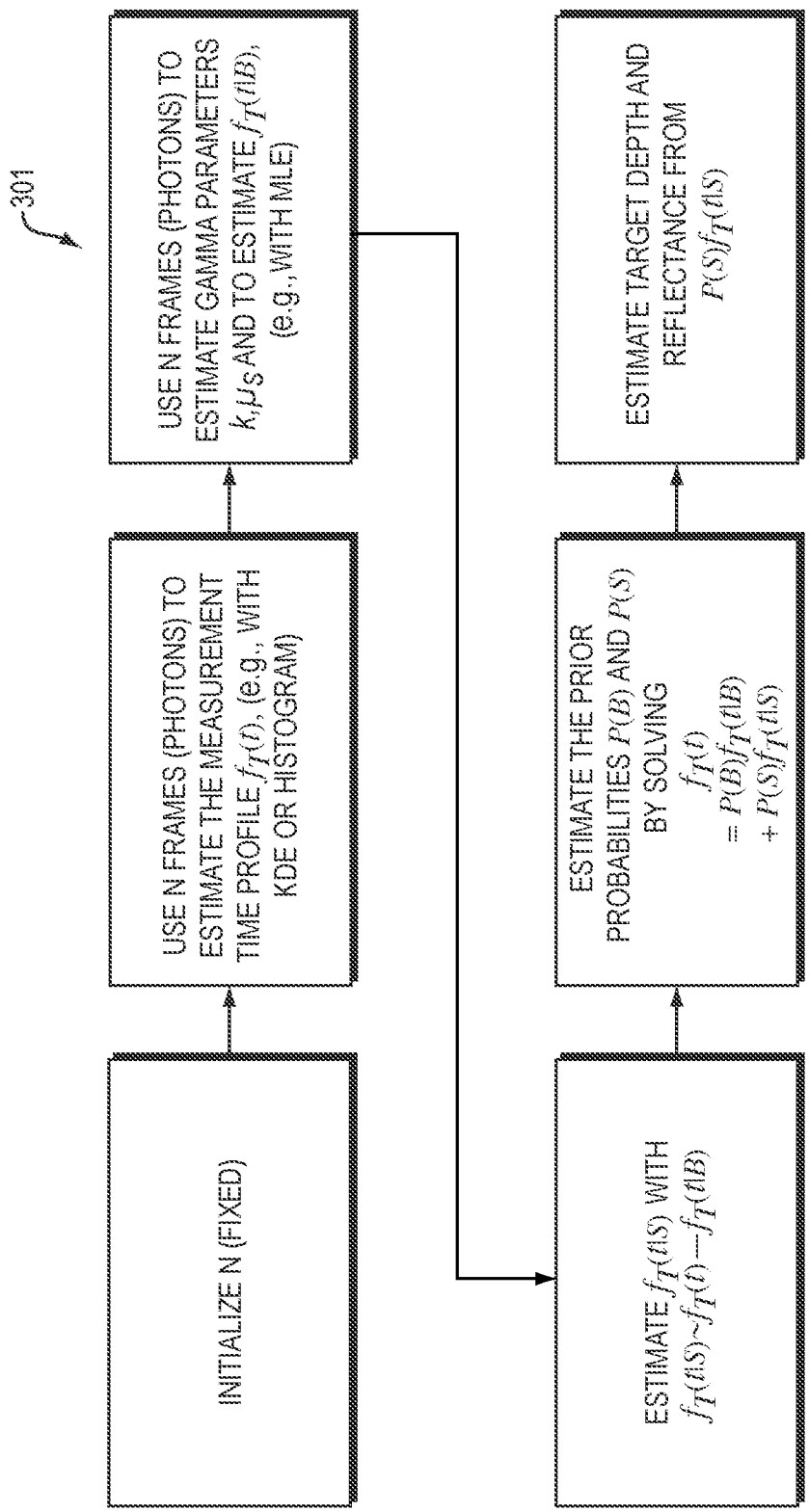

FIGS. 2 and 3 are each a flowchart of a method of imaging reflected light from a foggy scene.

The method shown in FIG. 2 includes at least the following steps: Illuminate, with laser light, a target object in a foggy scene. Capture, with a SPAD camera, time-resolved single photon counts of light reflecting from the foggy scene (Step 201). Employ a probabilistic algorithm to estimate back reflection from the fog (Step 202). Subtract the back reflection from the SPAD measurements, to recover the signal (Step 203). Process the signal to calculate: (a) reflectance of the target; and (b) a depth map of the target (Step 204).

In FIG. 3, an algorithm 301 determines target depth and reflectance.

Prototype

The following five paragraphs describe a prototype of this invention.

In this prototype, a PhotonForce™ PF32 SPAD camera has 32×32 pixels. Each pixel is single photon sensitive and time-tags measured photons with a nominal time resolution of 56 ps. The camera exposure time is set to 100 μs (the PF32 measures the arrival time of the first detected photon per-pixel per-exposure). Each reconstruction is composed of 20,000 frames. A new reconstruction is produced every 100 μs, while using a sliding window with a history of 2 seconds. For illumination, a SuperK pulsed super-continuum laser is spectrally filtered to a narrow band around 580 nm (the camera is equipped with a similar filter to reject background). The laser repetition rate is 80 MHz with a pulse duration of 5 ps with an average laser's optical power of 0.15 W. The laser light is diffused before entering the chamber and illuminates the scene (albeit with attenuation when fog is present).

In this prototype, the camera and laser are positioned in a reflection mode. That is, the camera and laser are positioned in such a way that light from the laser reflects from the scene back to the camera (rather than passing through the target and then traveling to the camera).

In this prototype, the SPAD camera has an acquisition period of 2 seconds (with a mean of 2,440 photons per acquisition period).

In this prototype, the measurements of photon arrival times are provided in picoseconds, to achieve numerical stability in parameter estimation. The KDE estimator uses a standard Gaussian kernel with a bandwidth of 80 ps. Negative values in the subtraction of the measured time profile and background are set to zero. To further improve the reconstruction quality of the reflectance map, the reflectance map: (a) is multiplied by μ (i.e., the mean of the reflection map) to amplify points that are further away; and (b) is thresholded to 0.2 of the peak. In this prototype, the threshold used as a confidence map for the depth estimation is 0.2 of the final reflectance map.

In this prototype, the computation time to recover the reflectance and depth per pixel is 0.03 seconds using unoptimized Matlab® code on a 3rd generation Apple® i7 desktop computer.

The prototype described in the preceding five paragraphs is a non-limiting example of this invention. This invention may be implemented in many other ways.

Sensitivity to Sensor Time Resolution

The suggested imaging method is based on the fact that background and signal photons have different statistics in time. This allows one to distinguish between them and reject the back reflectance from the fog. As the detector time resolution reduces, this ability diminishes.

In illustrative implementations, the sensor time resolution: (a) is much smaller than the standard deviation of the Gamma distribution of time of arrival of background photons; and (b) is much smaller than the standard deviation of the Gaussian distribution of time of arrival of signal photons. The desirable time resolution (of the sensor) may be a function of the mean time between scattering events, which may be related to the standard deviation of a Gamma distribution.

Time resolution: In some cases, the time resolution needed to computationally separate the target from the fog decreases as the size of scene increases. This is because the required time resolution may be a function of the scattering distribution standard deviation which becomes larger as scene size increases.

In some cases, the smaller the time resolution, the more accurate the depth resolution. Thus, the main constraint on time resolution may come from a desire for accurate depth resolution.

More Details

The parametric model described above assumes that k, the number of scattering events before detection, is a constant parameter similar to $\mu_s$.

In practice, however, k is not a constant, but is instead a random variable that varies from one photon detection to the next.

In some cases, a more accurate approach is employed, which models the probability density function of the time of arrival of background photons as $$f_T(t|B) = \int_{k=1}^{\infty} f_G(k, \mu_s) f_K(k) \, dk,$$

where $f_G(k, \mu_s)$ is a Gamma distribution and where $f_K(k)$ is the probability density function of time of arrival of a photon undergoing k scattering events before detection.

This invention is not limited to imaging through fog. In some use scenarios, this invention images through any scattering media, including smoke, haze, particulate air pollutants, dust, forest exudates, geyser steam, natural aerosol, manmade aerosol, turbid gas or turbid liquid. In some use scenarios, this invention performs medical imaging through scattering media such as tissue or blood. Each reference herein to fog, however worded, may be replaced by a reference to any or all of these scattering media. For instance, each "foggy scene" (which comprises both fog and a target) that is mentioned herein may instead comprise both a scattering media and a target.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of an imaging system, including any camera (e.g., SPAD camera) or any active light source (e.g., a laser); (2) to perform a pixelwise probabilistic algorithm that computationally separates background reflection and reflection from a target and that calculates reflectance and depth of a target; (3) to receive data from, control, or interface with one or more sensors; (4) to perform any other calculation, computation, program, algorithm, or computer function described or implied herein; (5) to receive signals indicative of human input; (6) to output signals for controlling transducers for outputting information in human perceivable format; (7) to process data, to perform computations, and to execute any algorithm or software; and (8) to control the read or write of data to and from memory devices (tasks 1-8 of this sentence referred to herein as the "Computer Tasks"). The one or more computers (e.g. 109) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, electronic devices (e.g., 101, 103, 109) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 109) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

"Archimedes' constant" means the ratio of a circle's circumference to its diameter. Archimedes' constant is sometimes called "pi" or "π". Archimedes' constant is an irrational number that is approximately equal to 3.14159.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a SPAD camera or other time-of-flight camera; and (f) a depth camera. In some cases, a camera includes any computers or circuits that process data captured by the camera.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

As used herein, a vertical (not slanted) line "|" denotes conditional probability. For instance, P(A|B) means the conditional probability of A given B.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number set forth to the right of the equation. For example: "Equation 1" means Equation 1 above. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

The phrase "Gamma distribution" is used herein in the statistical sense.

The phrase "Gaussian distribution" (also known as a normal distribution) is used herein in the statistical sense.

To say a "given" X is simply a way of identifying the X, such that the X may be referred to later with specificity. To say a "given" X does not create any implication regarding X. For example, to say a "given" X does not create any implication that X is a gift, assumption, or known fact.

As used herein, a hat shape (comprising two slanted lines that meet at a peak) over a mathematical term means that the term is estimated. For instance, $\hat{x}$ is an estimate of x.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

In the context of a camera, the "optical density" of fog during a temporal period means $$-\log\left(\frac{P_f}{P_0}\right),$$

where $P_0$ is power of light measured by the camera without the fog and $P_f$ is power of light measured by the camera during the temporal period with the fog present.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

To say that x is "much smaller" than y means that x<0.5 y.

A parenthesis is simply to make text easier to read, by indicating a grouping of words. A parenthesis does not mean that the parenthetical material is optional or may be ignored.

"Pixelwise" means pixel-by-pixel.

A non-limiting example of a photon that "reflects from the target" is a photon that reflects from the target and then travels straight to the camera without any scattering. Another non-limiting example of a photon that "reflects from the target" is a photon that reflects from the target and then scatters one or more times before reaching the camera.

As used herein, the term "set" does not include a group with no elements.

Unless the context clearly indicates otherwise, "some" means one or more.

"SPAD" means single-photon avalanche diode.

As used herein, a "subset" of a set consists of less than all of the elements of the set.

The term "such as" means for example.

As used herein, "times of arrival of photons" means multiple times of arrival, such that: (a) there are multiple photons; and (b) each of the photons, respectively, has only one time of arrival.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) taking measurements of a set of times of arrival of photons that reflect from a foggy scene, which foggy scene comprises fog and a solid target, which photons include signal photons and background photons, and which set includes times of arrival of the signal photons and times of arrival of the background photons; (b) performing kernel density estimation to estimate, based on the measurements, an overall distribution, which overall distribution is a pixelwise probability density function of all of the times of arrival in the set, including the times of arrival of the signal photons and of the background photons; (c) performing maximum likelihood estimation to estimate, based on the measurements, a Gamma distribution, which Gamma distribution is a pixelwise probability density function of the times of arrival of the background photons; (d) calculating a pixelwise difference equal to the overall distribution minus the Gamma distribution; (e) fitting the difference to a Gaussian distribution to estimate a pixelwise probability density function of the times of arrival of the signal photons; and (f) calculating, based on the probability density function of the times of arrival of the signal photons, (i) pixelwise depth of the target and (ii) pixelwise reflectance of the target; wherein the signal photons are photons that reflect from the target, and the background photons are photons that reflect from the fog without ever reflecting from the target. In some cases, the method further comprises illuminating the foggy scene with a pulsed laser. In some cases, the measurements are taken by a multi-pixel, single-photon avalanche diode (SPAD) camera. In some cases, for each specific frame in a set of frames, each specific pixel of the SPAD camera detects only one photon during the specific frame. In some cases, frame rate of the SPAD camera is dynamically adjusted over time, to adjust for changing density of the fog over time. In some cases, the pixelwise probability density function of the times of arrival of the background photons takes into account a variable number of scattering events of the background photons. In some cases, density of the fog is not spatially uniform in regions where the fog is present. In some cases, density of the fog changes over time during the method. In some cases, the target is at least 37 centimeters from the SPAD camera. In some cases, the method further comprises: (a) detecting, based on the pixelwise reflectance of the target, letters or numbers that are displayed by the target; and (b) recognizing, based on the letters or numbers, content of a message displayed by the target. In some cases, the camera is housed in a moving vehicle. In some cases, distance between the camera and the target is decreasing. In some cases, time resolution of the SPAD camera is much smaller than the standard deviation of the Gamma distribution and is much smaller the standard deviation of the Gaussian distribution. Each of the cases described above in this paragraph is an example of the method described in the first sentence of this paragraph, and is also an example of an embodiment of this invention that may be combined with other embodiments of this invention.

In some implementations, this invention is an apparatus comprising: (a) a single-photon avalanche diode (SPAD) camera; (b) a laser; and (c) one or more computers; wherein (i) the laser is configured to illuminate a foggy scene with pulses of light, which foggy scene comprises fog and a solid target, (ii) the SPAD camera is configured to take measurements of a set of times of arrival of photons that reflect from the foggy scene, which photons include signal photons and background photons, and which set includes times of arrival of the signal photons and times of arrival of the background photons, the signal photons being photons that reflect from the target, and the background photons being photons that reflect from the fog without ever reflecting from the target, and (iii) the one or more computers are programmed (A) to perform kernel density estimation to estimate, based on the measurements, an overall distribution, which overall distribution is a pixelwise probability density function of all of the times of arrival in the set, including the times of arrival of the signal photons and of the background photons, (B) to perform maximum likelihood estimation to estimate, based on the measurements, a Gamma distribution, which Gamma distribution is a pixelwise probability density function of the times of arrival of the background photons, (C) to calculate a pixelwise difference equal to the overall distribution minus the Gamma distribution, (D) to fit the difference to a Gaussian distribution to estimate a pixelwise probability density function of the times of arrival of the signal photons, and (E) to calculate, based on the probability density function of the times of arrival of the signal photons, (I) pixelwise depth of the target and (II) pixelwise reflectance of the target. In some cases, time resolution of the SPAD camera is much smaller than the standard deviation of the Gamma distribution and is much smaller the standard deviation of the Gaussian distribution. In some cases: (a) the SPAD camera has multiple pixels; and (b) each of the pixels is configured to detect only one photon during each frame of the camera. In some cases, the one or more computers are programmed to control frame rate of the SPAD camera in such a way that the frame rate changes over time, to adjust for changing density of the fog over time. In some cases, the one or more computers are programmed to estimate the pixelwise probability density function of the times of arrival of the background photons in such a way as to take into account a variable number of scattering events of the background photons. In some cases, the apparatus is housed in, or is configured to be housed in, a vehicle. In some cases, the apparatus is configured to determine pixelwise depth of the target and pixelwise reflectance of the target even when density of the fog: (a) is not spatially uniform in regions where the fog is present; or (b) is temporally variable. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising:
   (a) taking measurements of a set of times of arrival of photons that reflect from a foggy scene, which foggy scene comprises fog and a solid target, which photons include signal photons and background photons, and which set includes times of arrival of the signal photons and times of arrival of the background photons;
   (b) performing kernel density estimation to estimate, based on the measurements, an overall distribution, which overall distribution is a pixelwise probability density function of all of the times of arrival in the set, including the times of arrival of the signal photons and of the background photons;
   (c) performing maximum likelihood estimation to estimate, based on the measurements, a Gamma distribution, which Gamma distribution is a pixelwise probability density function of the times of arrival of the background photons;
   (d) calculating a pixelwise difference equal to the overall distribution minus the Gamma distribution;
   (e) fitting the difference to a Gaussian distribution to estimate a pixelwise probability density function of the times of arrival of the signal photons; and
   (f) calculating, based on the probability density function of the times of arrival of the signal photons, (i) pixelwise depth of the target and (ii) pixelwise reflectance of the target;
   wherein the signal photons are photons that reflect from the target, and the background photons are photons that reflect from the fog without ever reflecting from the target.

2. The method of claim 1, wherein the method further comprises illuminating the foggy scene with a pulsed laser.

3. The method of claim 1, wherein the measurements are taken by a multi-pixel, single-photon avalanche diode (SPAD) camera.

4. The method of claim 3, wherein, for each specific frame in a set of frames, each specific pixel of the SPAD camera detects only one photon during the specific frame.

5. The method of claim 3, wherein frame rate of the SPAD camera is dynamically adjusted over time, to adjust for changing density of the fog over time.

6. The method of claim 1, wherein the pixelwise probability density function of the times of arrival of the background photons takes into account a variable number of scattering events of the background photons.

7. The method of claim 1, wherein density of the fog is not spatially uniform in regions where the fog is present.

8. The method of claim 1, wherein density of the fog changes over time during the method.

9. The method of claim 3, wherein the target is at least 37 centimeters from the SPAD camera.

10. The method of claim 1, wherein the method further comprises:
    (a) detecting, based on the pixelwise reflectance of the target, letters or numbers that are displayed by the target; and
    (b) recognizing, based on the letters or numbers, content of a message displayed by the target.

11. The method of claim 3, wherein the camera is housed in a moving vehicle.

12. The method of claim 3, wherein distance between the camera and the target is decreasing.

13. The method of claim 3, wherein time resolution of the SPAD camera is much smaller than the standard deviation of the Gamma distribution and is much smaller the standard deviation of the Gaussian distribution.

14. An apparatus comprising:
    (a) a single-photon avalanche diode (SPAD) camera;
    (b) a laser; and
    (c) one or more computers;
    wherein
    (i) the laser is configured to illuminate a foggy scene with pulses of light, which foggy scene comprises fog and a solid target,
    (ii) the SPAD camera is configured to take measurements of a set of times of arrival of photons that reflect from the foggy scene, which photons include signal photons and background photons, and which set includes times of arrival of the signal photons and times of arrival of the background photons, the signal photons being photons that reflect from the target, and the background photons being photons that reflect from the fog without ever reflecting from the target, and (iii) the one or more computers are programmed (A) to perform kernel density estimation to estimate, based on the measurements, an overall distribution, which overall distribution is a pixelwise probability density function of all of the times of arrival in the set, including the times of arrival of the signal photons and of the background photons, (B) to perform maximum likelihood estimation to estimate, based on the measurements, a Gamma distribution, which Gamma distribution is a pixelwise probability density function of the times of arrival of the background photons, (C) to calculate a pixelwise difference equal to the overall distribution minus the Gamma distribution, (D) to fit the difference to a Gaussian distribution to estimate a pixelwise probability density function of the times of arrival of the signal photons, and (E) to calculate, based on the probability density function of the times of arrival of the signal photons, (I) pixelwise depth of the target and (II) pixelwise reflectance of the target.

15. The apparatus of claim 14, wherein time resolution of the SPAD camera is much smaller than the standard deviation of the Gamma distribution and is much smaller the standard deviation of the Gaussian distribution.

16. The apparatus of claim 14, wherein:

(a) the SPAD camera has multiple pixels; and (b) each of the pixels is configured to detect only one photon during each frame of the camera.

17. The apparatus of claim 14, wherein the one or more computers are programmed to control frame rate of the SPAD camera in such a way that the frame rate changes over time, to adjust for changing density of the fog over time.

18. The apparatus of claim 14, wherein the one or more computers are programmed to estimate the pixelwise probability density function of the times of arrival of the background photons in such a way as to take into account a variable number of scattering events of the background photons.

19. The apparatus of claim 14, wherein the apparatus is housed in, or is configured to be housed in, a vehicle.

20. The apparatus of claim 14, wherein the apparatus is configured to determine pixelwise depth of the target and pixelwise reflectance of the target even when density of the fog:

(a) is not spatially uniform in regions where the fog is present; or (b) is temporally variable.

* * * * *